United States Patent [19]

Giovannetti

[11] 4,343,566
[45] Aug. 10, 1982

[54] CLAMPING DEVICE FOR RELEASABLY SNAP JOINING TWO PIECES OR PANELS

[76] Inventor: Fiorello Giovannetti, Via Marciano, 4, Milano, Italy

[21] Appl. No.: 112,565

[22] Filed: Jan. 16, 1980

[30] Foreign Application Priority Data

Mar. 23, 1979 [IT] Italy ............................. 21246 A/79

[51] Int. Cl.³ .................. B25G 3/00; F16D 1/00; F16G 11/00
[52] U.S. Cl. ................................ 403/405; 403/231; 403/322; 403/297; 403/245
[58] Field of Search .............. 403/231, 276, 245, 407, 403/277, 353, 322, 324, 297

[56] References Cited

U.S. PATENT DOCUMENTS 4,127,353 11/1978 Busse .......................... 403/231 X
4,131,376 12/1978 Busse .......................... 403/231 X
4,163,618 8/1979 Giovannetti ....................... 403/245

FOREIGN PATENT DOCUMENTS 2855216 7/1979 Fed. Rep. of Germany ...... 403/231

*Primary Examiner*—Wayne L. Shedd
*Attorney, Agent, or Firm*—Fleit & Jacobson

[57] ABSTRACT

A clamping device for releasably snap joining or clamping two panels comprises a plug element and a bush element. The plug element comprises: a stem portion engageable with the walls of a hole in a panel; a body portion; a head portion formed with legs that can be resiliently moved near one another and defined by at least one longitudinal slit; a notch extended from the longitudinal slit within the body; and a slider slidable between the legs to lock the latter at widened out position.

14 Claims, 8 Drawing Figures

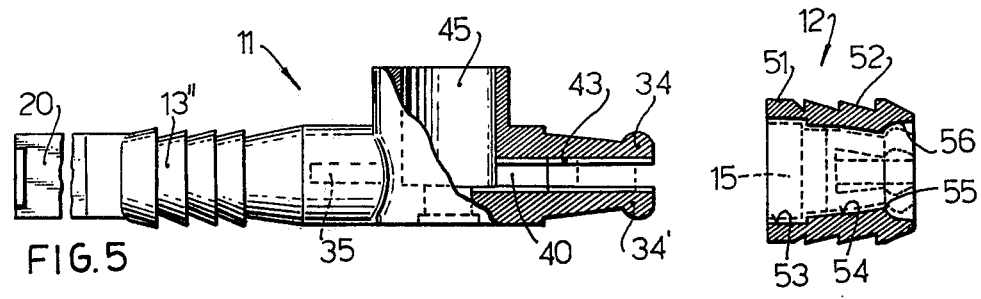
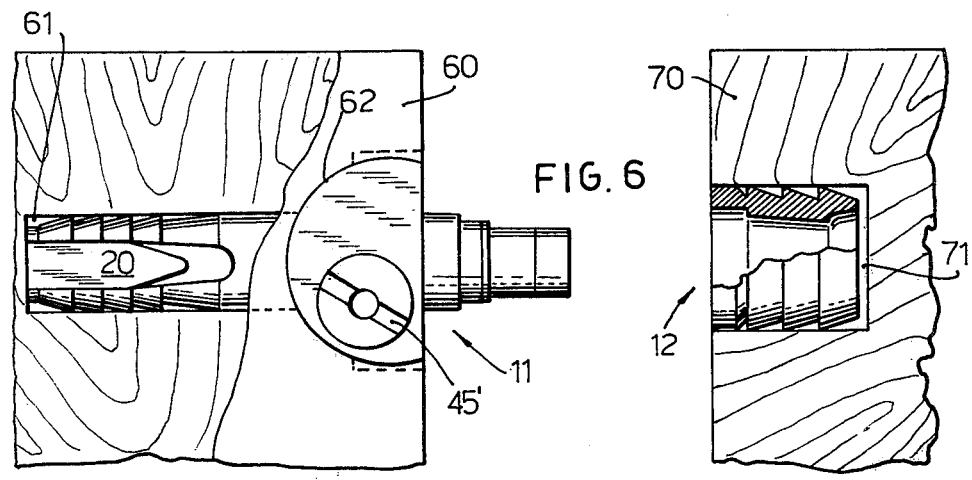
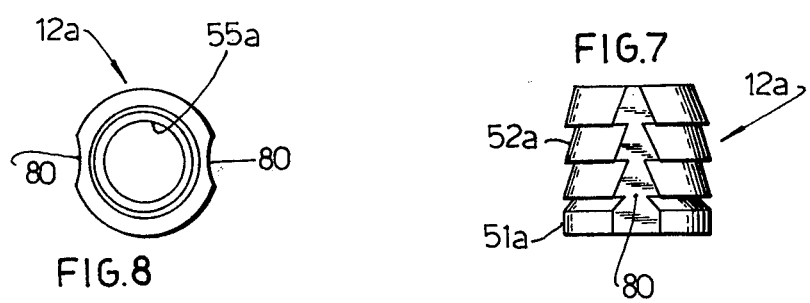

CLAMPING DEVICE FOR RELEASABLY SNAP JOINING TWO PIECES OR PANELS

This application relates to jointing or clamping devices for parts or pieces, more particularly but not exclusively for furniture panels.

Various releasable or not releasable clamping devices are known. By way of example, the prior U.S. Pat. Nos. 3,730,568, 4,163,618 and Ser. No. 985,205 of the same applicant should be mentioned. The devices disclosed in said patents have been devised for performing various requirements and proved successful for the intended field of application. However for some uses, some of these devices (for example according to U.S. Pat. No. 3,730,568) were too expensive; on the other hand, other devices (as those of U.S. Pat. No. 4,163,618 and Ser. No. 958,205) required that a user should separately bring some parts of the joints or clamping devices that were essential for closing thereof in panel assembling; in case of loss of these separated parts, it was impossible to assemble the panels. In the art there was since long the need of having a rather inexpensive clamping device, the elements of which could be incorporated completed of every part in the panels to be assembled just from manufacture, which device would enable an easy assembling of the panels when required, even by those unskilled in the art and without any special equipment.

The clamping device according to the present application was then devised, which device comprises a plug element and a bush element; the plug element is intended to be secured in one of two panels to be assembled; the bush element is intended to be secured in the other panel to be assembled; the plug element comprises a shank or stem portion with means for being permanently secured in a hole of one panel, a body integral with said shank and intended to be also received in a hollow or cavity in said panel, and a head intended to project from said panel.

The bush element is formed with means, generally finnings or ribs, for permanent fastening in a hole in the respective panel, and has a hollow or cavity to accommodate said head. In a particular embodiment, said bush has longitudinal zones that are flattened or of reduced thickness.

The head of the plug element is formed with at least one longitudinal slit defining two arms that can be resiliently moved or flexed to each other so as to enter the bush hollow or cavity and snap engage the latter. According to a feature of the present invention, the slit between the arms is extended internally of the body of the plug element with a notch receiving a slider for movement between a retracted position within the notch and an extended position between the head arms. When such a slider is at retracted position, the arms can be resiliently moved near one another (i.e. inflected one toward the other) and enable the head to be inserted into and removed from the bush; when the slider is extended between the arms, the latter can be no more moved near one another and therefore, should the head be inserted in the bush, the device would remain clamped in fastening position of the two panels. In order to move the slider between the extended position and the retracted position, a rack toothed zone is provided on the slider and meshes with a toothed zone on a pinion received in a body seat; the rotation of the pinion in either direction causes the forward movement and retraction of the slider.

A first advantage of the device according to the invention is that furniture or articles of furnishings can be shipped from the factory in a knocked down form, i.e. in the form of panels to be assembled, and the latter carry the elements of the clamping device previously incorporated at predetermined positions, that is with the plug element having the projecting head on a panel, and the bush element on the other panel, of two panels to be assembled, without any opportunity of losing any means required for the panel assembling. A second advantage consists in that the assembling of the panels can be easily and quickly effected by slipping the plug head in the bush and dealing a blow, without requiring any special fittings and without any opportunity of mistakes. A further advantage of the invention resides in that such a connection can be made fixed by merely rotating the pinion, and this can be done by engaging a slot of the pinion with a screw-driver or a coin or any other means at hand; when desired, the connection can be disconnected by rotating the pinion in opposite direction.

Generally, the fastening device is made of molded plastic material (such as acetal resins and polyamide resins) and a further advantage thereof consists of affording relatively low manufacturing cost.

By way of unrestrictive example, an exemplary embodiment of the invention will now be described with reference to the accompanying drawings, in which:

FIG. 5 is a general side view partly cutaway of the clamping device, prior to the insertion of the device elements in the respective panels; the position of the head of a first element within a bush or second element is shown in dashed lines;

FIG. 6 is a general partly sectional view of the clamping device as seen from the top relative to FIG. 5, as assembled and with the elements inserted in respective panels shown partly cutaway; and FIGS. 7 and 8 are respectively a side view of a second type of bush and a bottom view of FIG. 7.

The clamping device of this application comprises a plug element 11 and a bush element 12 (FIG. 5).

Figure 1:
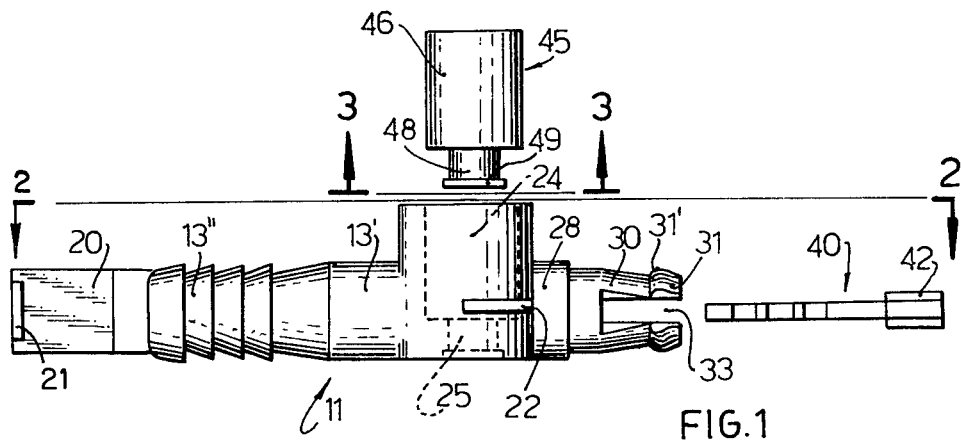
FIG. 1 is an exploded side view showing an element of the clamping or fastening device prior to insertion in a panel.
Figure 2:
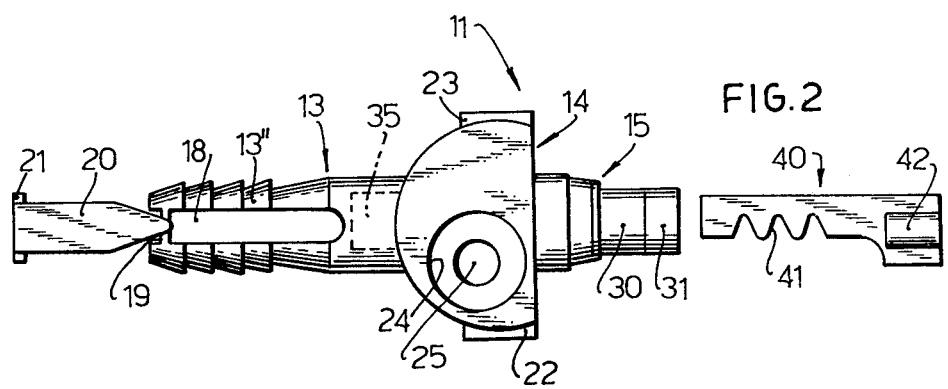
FIG. 2 is a view taken along line 2—2 of FIG. 1.

The plug element 11 (FIGS. 1, 2 and 5) comprises a shank portion 13, a body portion 14 and a head portion 15, rigidly integral to one another. Conventionally, said shank 13 has a generally cylindrical zone 13' of substantially smooth contour, and a finned or ribbed zone 13" of a per se known shape with approximately saw-toothed ribs, for engagement against the walls of a hole (as 61 in FIG. 6) in a panel (as 60 in FIG. 6), so as to resist the removal of said element 11 from the panel. A longitudinal axial aperture 18 longitudinally divides the ribbed zone 13" so as to impart some radial elasticity thereto, and a spreader 20 is carried at the end of the slit by webs or baffles 19 of reduced thickness. As well known, such a spreader has at the front a wedge shape, followed by a zone of constant width at least slightly larger than the width of aperture 18, and also has a widened end plate 21 for successful bearing on the bottom of the hole in the panel.

Preferably, the body 14 of the plug element is in the form of cylinder portion, the axis of the body cylinder being substantially perpendicular to the substantially coincident axes of the shank and head; the cylinder portion of the body is defined by a lower base, an upper base substantially at a higher level than the shank portion and head portion of the element, a cylindrical surface and a plane parallel to the cylinder axis, said plane intersecting chordally the cylindrical surface, at a position somewhat spaced apart from the cylinder axis.

Preferably, two rigid diametrically opposite tabs 22 and 23 extend from the cylindrical surface of the body for an improved engagement in the wood of the panel to be secured. The body 14 has a substantially cylindrical pocket or seat 24, with axis spaced apart from and parallel to the axis of the cylinder, and opening at the upper surface of the body. This seat 24 extends at the bottom with a through hole 25 of a smaller diameter than that of the seat.

As above mentioned, the head 15 extends from body 14 nearly coaxially with shank 13 and has a first substantially cylindrical collar zone 28, a tapered zone 30 extending therefrom and terminating at the end in a radially projecting zone 31. Through the radially projecting zone 31 and tapered zone 30 there is provided an axial slit 33 dividing part of the head into two legs 34 and 34' that are resiliently deformable in a radial direction. This slit 33 extends within body 14 and for a length within shank 13 by means of a notch 35 (shown by dashed lines in FIGS. 2 and 5).

A slider 40 (FIGS. 1 and 2) is, for example, in the form of a plate of sufficient size to be received in notch 35 and slide therein, and has a rack-toothed zone 41 at a longitudinal side thereof and, although not essential, a cylindrical enlargement 42 for engagement in a cylindrical guide 43 provided longitudinally of legs 34 and 34'. This slider 40 is slidable between a retracted position in said notch 35, wherein it does not occupy or engage the slit 33 (shown in full line in FIG. 5), and an extended position, wherein for at least a substantial degree it occupies or engages said slit 33 (shown in dashed line in FIG. 5).

Figure 3:
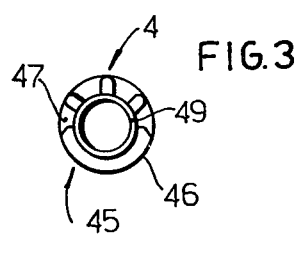
FIG. 3 is a view of the pinion taken along line 3—3 of FIG. 1.
Figure 4:
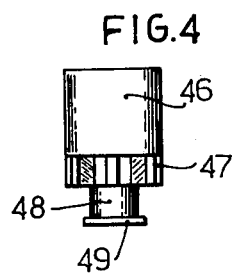
FIG. 4 is a view of the pinion taken from arrow 4 in FIG. 3.

A pinion 45 (FIGS. 1, 3 and 4) is also part of said plug element 11 and is accomodated within the seat 24 in body 14. This pinion 45 has a substantially cylindrical surface 46 with a toothed zone 47 (at the bottom in FIG. 4) on part of the circumference, to mesh with the toothed zone 41 on said slider 40. A lower extension 48, of a smaller diameter than said pinion, is for engagement with the hole 25 in body 14, while an enlargement 49 at the end of extension 48 is for holding said pinion in place without any risk of inadvertent removal or disassembling. At the top, said pinion 45 has a slot 45' (FIG. 6) or other operating means.

The above mentioned bush 12 of the device is externally formed with a first substantially cylindrical length or portion 51, and a radial finning or ribbed surface 52 of conventional substantially saw-tooth longitudinal outline of a diameter slightly larger than the diameter of the cylindrical length or portion to provide a successful engagement or grip against the walls of the panel hole intended to receive the bush. In this first exemplary embodiment of bush, said radial finning 52 extends throughout the circumference of the bush.

Internally the bush hollow or cavity has a first substantially cylindrical zone 53 of sufficient size to receive said collar 28 of the plug head 11; then, it has a tapered portion 54 for receiving the tapered portion 30 of the plug head 11, a restricted circumference 55, and then a widened portion 56 for receiving the plug zone 31.

Preferably, both said plug zone 31 and widened portion 56 of the bush hollow or cavity have inclined surfaces 31' (FIG. 1), and 56' (FIG. 5) to facilitate mutual disconnection thereof.

The fastening or clamping device may be provided from any material having sufficient resilience and mechanical strength; preferably, it is a molded article of acetal resin or polyamide resin.

In order to apply the plug element and bush element to the panels 60 and 70 to be assembled, a hole 61 is drilled on the first panel 60 from the edge intended to be applied to the other panel on assembling; then, a cavity or partial hole 62 is provided, with axis perpendicular to the axis of hole 61 and spaced apart from the hole edge by a predetermined spacing less than the hole radius; then the complete plug element 11 is forcibly introduced, such an element being clamped in place (FIG. 6) by the ribs of zone 13" pressed against the sides of hole 61 by the introduction of the spreader 20 into the longitudinal aperture 18. The final position of body 14 is such that the operating slot 45' of pinion 45 is accessible; generally, the upper side or face of body 14 will remain at level or flush with the surface of panel 60. A hole 71 is drilled in panel 70 and said bush 12 is forcibly introduced into said hole, which bush cannot be removed due to the provision of finnings 52.

The panels thus completed with the assembling of elements 11 and 12 can be packed, transported and shipped, as desired, without it being necessary to ship or enclose additional parts for assembling. When desiring to assemble, it will suffice to approach the panels at the position shown in FIG. 6, introduce the head 15 into the hollow or cavity of bush 12 and deal a blow or exert a pressure. Thus, the legs 34 and 34' of head 15 will sufficiently flex to enable the enlarged zone 31 to pass beyond the restricted zone or circumference 55 of the bush, and then resiliently restore the undeformed position. Such an assembling operation can be manually carried out. The two panels are thus connected, but not permanently, since due to the provision of inclined surfaces 31' and 56' on the head and bush, respectively, and due to the resilience of legs 34 and 34', the head 15 can be slipped off of bush 12. In order to make the connection permanent, it will suffice to turn the pinion 45 by means of a screwdriver, a coin or the like engaging the slot 45', so as to cause the slider 40 to position between said legs 34 and 34', so as to prevent the latter from resiliently flexing toward each other. On the other hand, a reverse rotation of the pinion will still enable to release the connection. As it will be appreciated, a releasable snap clamping device of easy and rapid use has been thus provided.

The bush 12a of FIGS. 7 and 8 has on the finned outer surface 52a two or more flattened zones 80 slightly hollowed out or also of reduced thickness, free of ribs and extended parallel to the bush axis. Preferably, these zones 80 are symmetrically arranged. The other parts of bush 12a remaining unaltered with respect to the corresponding parts of bush 12 have been designated by corresponding numerals followed by letter a, and will not be further described. Substantially, the zones 80 of bush 12a form the zones of minor strength and resiliently deformable. This enables to achieve by said bush 12a particularly excellent fastening results. Thus, by forcibly introducing said bush 12a in a panel hole, such a bush will be slightly squeezed by deformation of zones 80, and as a result the cavity sections therein will be restricted; on assembling, the resiliently deformable legs 34 and 34' of the plug element will move near each other for introduction into the bush hollow or cavity; by moving the slider therebetween, not only the result is achieved of clamping the connection between plug and bush, but the result is also achieved of partially widening out the bush, so that the finning 52a has an improved engagement with the wall of the panel hole. By this form of bush 12a, a further advantage consists of that the same can be applied in holes adjacent the panel surface, with a flattened portion placed in the hole portion closest to the panel surface, and this allows to avoid evident damages on said panel surface due to the provision of said bush.

Of course, changes and modifications can be made to the foregoing description without departing from the field of this application.

I claim:

1. A jointing or clamping device for releasably snap joining two parts, comprising a plug element insertable into one of said parts, and a bush element insertable into the other of said parts, wherein said plug element comprises:
    a stem or shank portion having a zone shaped for engagement with the walls of a hole formed in said one part;
    a body portion connected to said stem portion;
    a head portion connected to said body portion and formed with legs resiliently movable toward one another and defined by at least one longitudinal slit, at least a part of the slitted head portion protruding from said one part when said plug element is inserted in the hole in said one part;
    a notch extended from said longitudinal slit within said body portion;
    a slider slidable from a position at least partially extended in said longitudinal slit between the said legs, thereat preventing said legs from resiliently flexing towards each other, and a retracted position in said notch wherein said legs are resiliently movable toward one another.

2. A device according to claim 1, wherein said body portion comprises a seat having an axis substantially perpendicular to said notch for the slider, said slider having a rack-toothed zone, in said seat said body portion comprising a rotatable pinion with toothed portion for meshing with said rack on the slider.

3. A device according to claim 2, wherein said pinion is formed on an exposed surface thereof with an operating slot.

4. A device according to claim 1, wherein said body portion is shaped as a cylinder portion cut according to a chordal plane parallel to the cylinder axis, the cylinder axis being substantially perpendicular to the axis of said stem and spaced apart from said chordal plane by a spacing less than the cylinder radius.

5. A device according to claim 2, wherein said body portion has a through hole on the axis of said seat for the engagement of a lower assembling or mounting extension on said pinion.

6. A device according to claim 1, wherein said stem has at least one longitudinal axial aperture in said engagement zone, a spreading means being connected to the end of said aperture by readily tearable webs.

7. A device according to claim 1, wherein said body portion has tabs extended from said body portion at intermediate height at opposite position thereon.

8. A device according to claim 1, wherein said head portion has a collar zone of major diameter, a zone tapering to an end of the head portion, an enlarged or radially projecting zone at the head end, said radially enlarged zone being defined by shaped surfaces for facilitating the head portion introduction into and removal from the bush element.

9. A device according to claim 11, wherein said further enlarged zone has a surface inclined to said restricted circumference.

10. A device according to claim 11, wherein said bush element is externally formed with longitudinally extending zones of reduced thickness, with flattened or hollowed out surface.

11. A jointing or clamping device for releasably snap joining two parts, comprising a plug element insertable into one of said parts, and a bush element insertable into the other of said parts, wherein said plug element comprises:
    a stem or shank portion having a zone shaped for engagement with the walls of a hole formed in said one part;
    a body portion connected to said stem portion;
    a head portion connected to said body portion and formed with legs resiliently movable toward one another and defined by at least one longitudinal slit, at least a part of the slitted head portion protruding from said one part when said plug element is inserted in the hole in said one part;
    a notch extended from said longitudinal slit within said body portion;
    a slider slidable from a position at least partially extended in said longitudinal slit between the said legs, thereat preventing said legs from resiliently flexing towards each other, and a retracted position in said notch wherein said legs are resiliently movable toward one another, said head portion having a collar zone of major diameter, a zone tapering to the head end, an enlarged or radially projecting zone at the head end, said radially enlarged zone being defined by shaped surfaces for facilitating the head portion introduction into and removal from the bush element, said bush element being externally formed with finnings for fastening to a hole in said other part, and internally formed with a hollow or cavity including an enlarged or widened zone for receiving said head collar zone; a tapered zone for receiving the tapered zone of the head portion; a restricted circumference to clamp the enlarged head portion against removal, and a further enlarged zone for receiving the enlarged head zone.

12. A jointing or clamping device for releasably snap joining two parts or panels comprising:
    a plug element for a fixed application in one of said panel; and
    a bush element for a fixed application in the other of said panels, wherein said plug element is an integral piece and comprises:
    a stem or shank portion with a zone for engagement with the walls of a hole in said one panel;
    a body portion integral with the shank portion;
    a head portion integral with the body portion on one of its sides opposed to the shank, said head portion being formed with legs that can be resiliently moved toward one another and defined by at least one longitudinal slit;

a notch extended from said longitudinal slit within said body portion; and a slider slidable from a position at least partially extended in said longitudinal slit between the said legs, thereat preventing said legs from resiliently moving toward each other, and a retracted position in said notch, thereat allowing the resilient movement of said legs.

13. A device according to claim 12, wherein said body portion comprises a seat having an axis substantially perpendicular to said notch for the slider, said slider having a rack-toothed zone, said body portion comprising in said seat a rotatable pinion with toothed portion for meshing with said rack on the slider, and wherein said pinion consists of a large cylindrical portion integral with said toothed portion and a narrower cylindrical extension integral with the toothed portion and opposed to the large cylinderical portion, and said seat comprises a through hole to receive and anchor the pinion.

14. A device according to claim 12, wherein said legs protrude from said one panel when said plug element is applied thereto.

* * * * *